March 23, 1954  C. E. DRAKE  2,673,279
MEANS AND METHOD FOR MAKING CARBIDE TIPPED SAWS
Filed May 18, 1950  5 Sheets-Sheet 1

INVENTOR
CLAUD E. DRAKE
BY
Alfred Witchoff
ATTORNEY

March 23, 1954  C. E. DRAKE  2,673,279
MEANS AND METHOD FOR MAKING CARBIDE TIPPED SAWS
Filed May 18, 1950  5 Sheets-Sheet 2
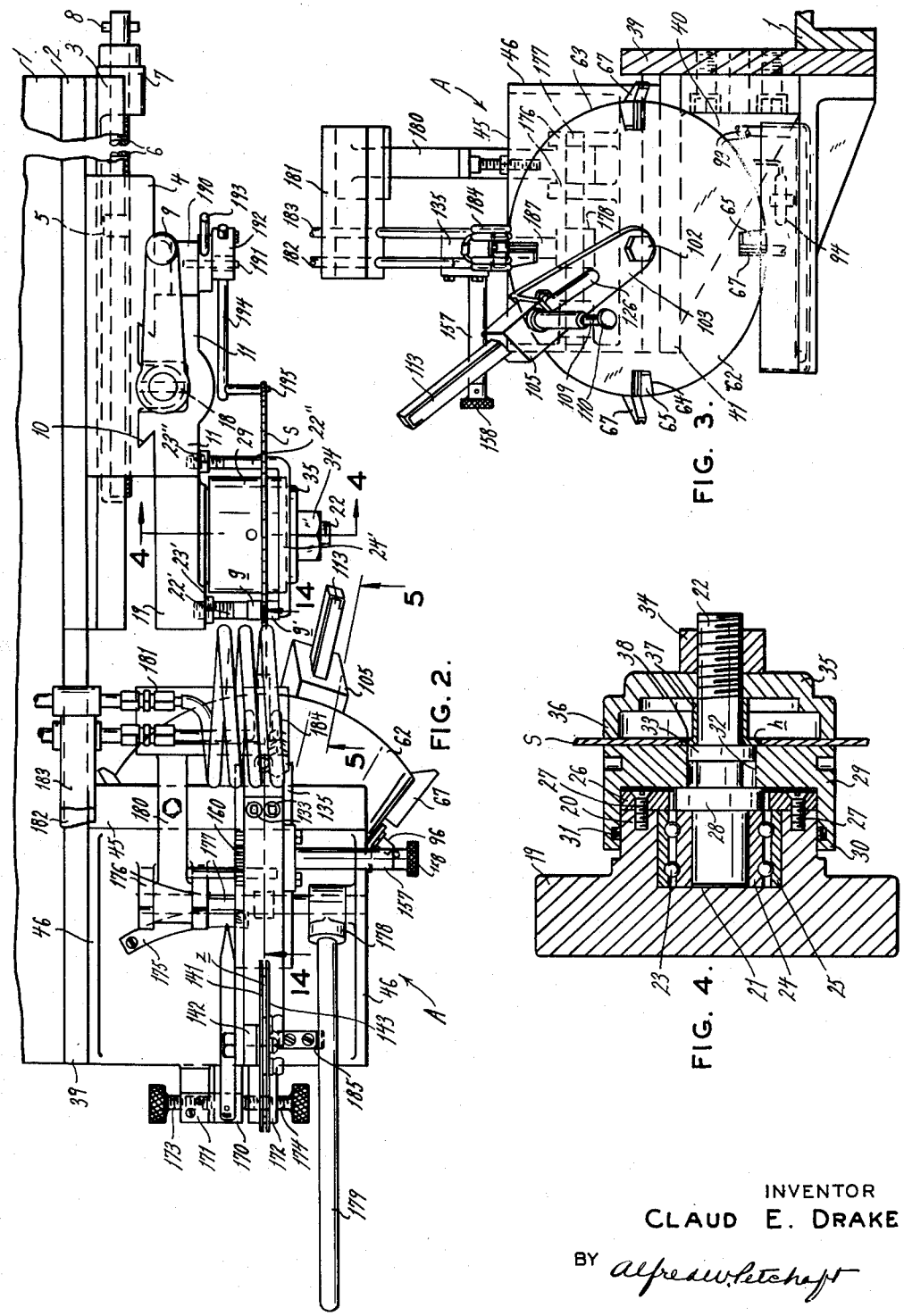
INVENTOR
CLAUD E. DRAKE
BY
ATTORNEY March 23, 1954  C. E. DRAKE  2,673,279
MEANS AND METHOD FOR MAKING CARBIDE TIPPED SAWS
Filed May 18, 1950  5 Sheets-Sheet 3
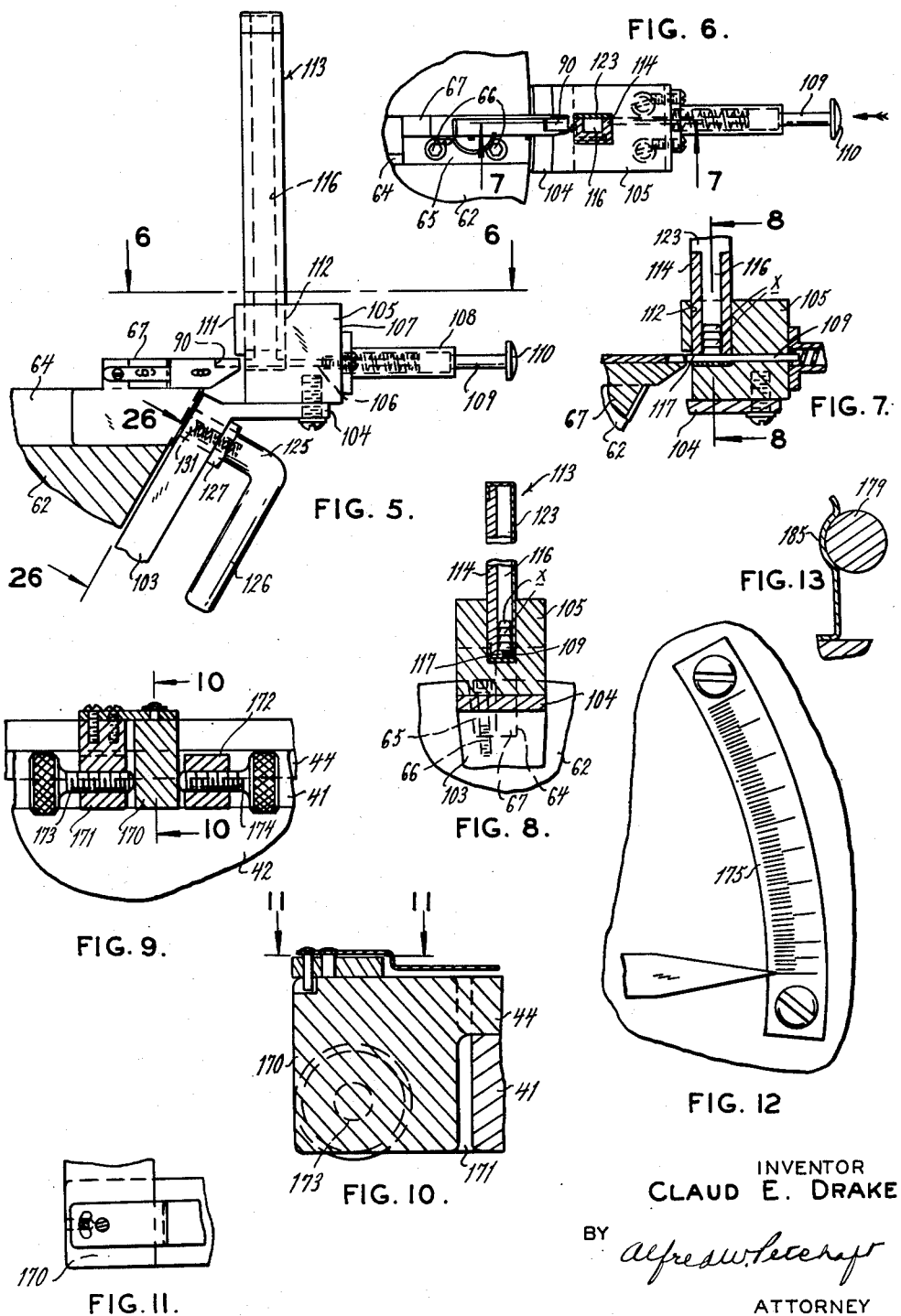
INVENTOR
CLAUD E. DRAKE
ATTORNEY March 23, 1954     C. E. DRAKE     2,673,279
MEANS AND METHOD FOR MAKING CARBIDE TIPPED SAWS
Filed May 18, 1950     5 Sheets-Sheet 4
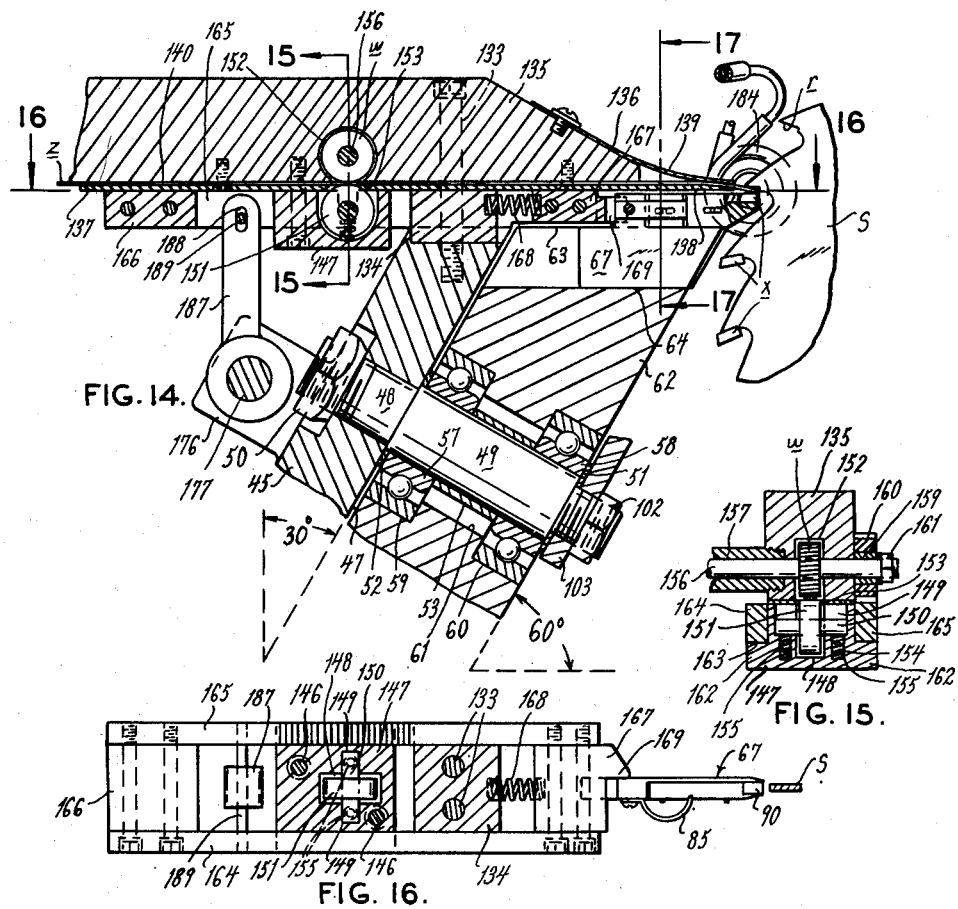
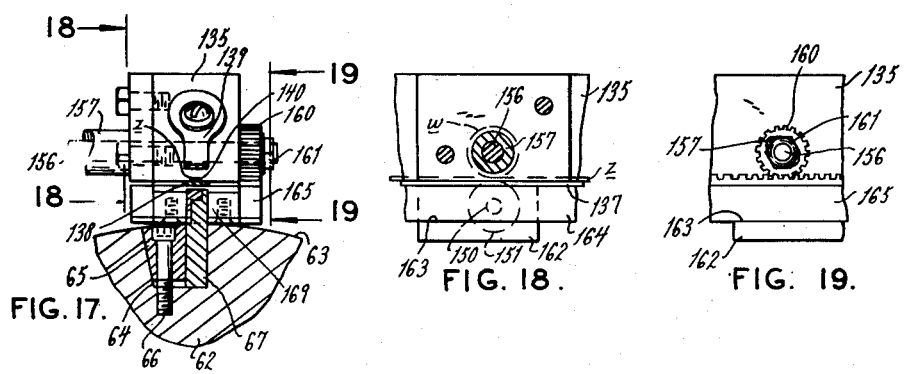
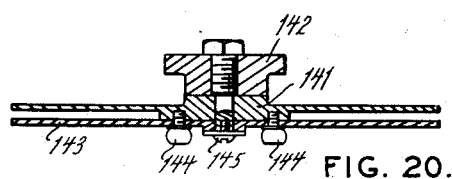
INVENTOR
CLAUD E. DRAKE
BY
ATTORNEY March 23, 1954  C. E. DRAKE  2,673,279
MEANS AND METHOD FOR MAKING CARBIDE TIPPED SAWS
Filed May 18, 1950  5 Sheets-Sheet 5
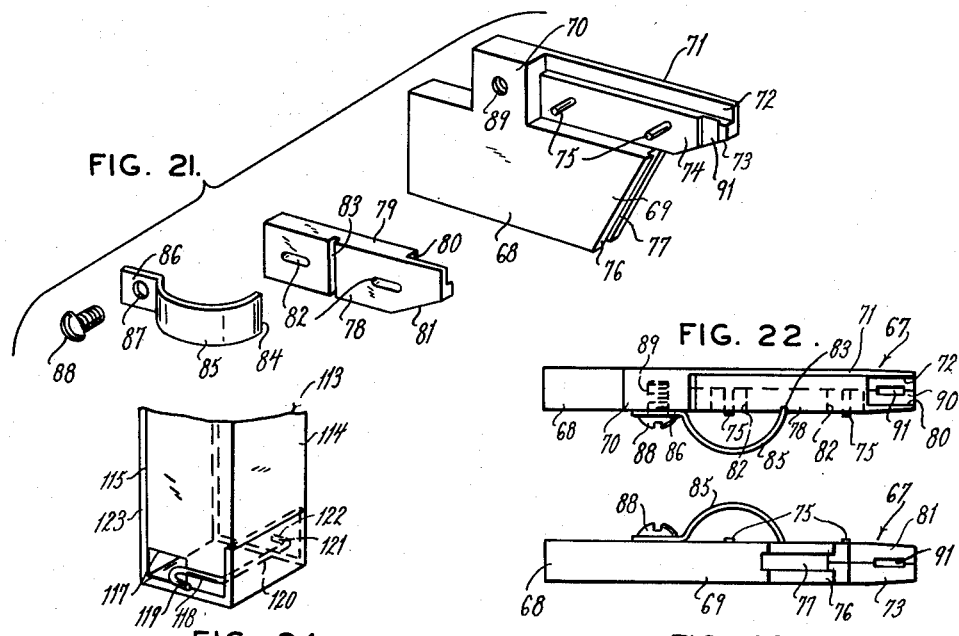
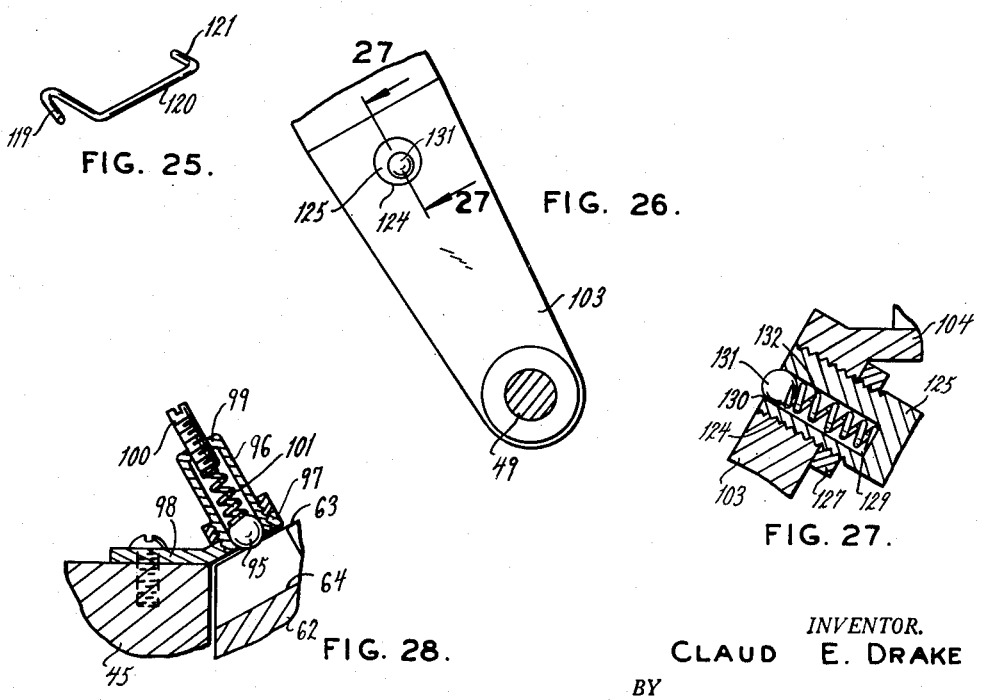
INVENTOR.
CLAUD E. DRAKE
BY
ATTORNEY Patented Mar. 23, 1954

2,673,279

UNITED STATES PATENT OFFICE 2,673,279

MEANS AND METHOD FOR MAKING
CARBIDE TIPPED SAWS

Claud E. Drake, Brentwood, Mo.

Application May 18, 1950, Serial No. 162,627

7 Claims. (Cl. 219—12)

This invention relates in general to certain new and useful improvements in means and methods for making carbide tipped saws and the like.

Heretofore, carbide tipped cutting tools, such as circular saws, milling cutters, and the like, have been manufactured by blanking out or otherwise forming the steel plate or disc comprising the body of the cutter. The teeth are suitably recessed, either in the original blanking operation or by subsequent grinding, and slugs of sintered carbide or other heavy dense alloy tipping material are then manually set into place and clamped or otherwise held in such position while being brazed with an oxyacetylene torch or similar device. The brazing is usually done with either silver solder, tobin bronze, copper sandwich alloy, and conventional fluxing agents. Thereafter, the carbide tips are each successively ground to conform to the desired tooth pattern. This method has proved extremely costly, both in terms of material and labor, since the slug of tipping material is usually substantially larger than necessary and, therefore, a good portion of it is wasted during the grinding operation; and because it is necessary to grind a good deal of the slug of tipping material away at relatively slow speeds, because of its hardness and other physical characteristics, a great deal of time and labor is unnecessarily expended. As has been more fully described in my copending applications appreciable economy and much improved efficiency in the cutting operations of the cutter itself can be achieved by employing pre-formed tips of precisely engineered shape and design. This procedure, however, requires a degree of accuracy in tip placement and retention during the brazing operation which has been thought impossible of attainment by existing methods.

Another and quite different problem encountered in the above-described manual method of carbide tipping is also due to inherent difficulties in all manual methods; that is to say lack of uniformity in execution of the procedure involved. For example, the workmen in setting the tipping slug in place will ordinarily apply more or less pressure to the clamping devices which hold the tooth in place, so that at the instant during which the brazing material begins to flow and the brazing joint is being formed a greater or lesser degree of the molten metal will be squeezed out of the joint. This lack of uniformity leads to a rather high incidence of tip loss when the cutter is actually subjected to the working conditions under which it must operate.

Finally, the use of heat generating means, such as oxyacetylene and oxyhydrogen torches, introduce further problems which are inherent in any operation employing such heating means. The heat cannot be applied with precise uniformity to each successive tooth, nor can it be sufficiently localized to prevent extensive thermal changes from taking place around the rim of the saw. Because all circular saw plates and similar types of cutters must undergo an extensive and painstaking tensioning operation so that they will run true at high speeds, the penetration of heat inwardly from the region of the tip into the body of the saw plate creates new and different stresses than those present in the saw immediately after it has been tensioned. Therefore, carbide tip saws and cutters, which have been tensioned by conventional manual methods, frequently do not run true and often tend to develop rim cracks and other defects which seriously impair the life and efficiency of the saw or cutter.

It is, therefore, the primary object of the present invention to provide methods and means for brazing tips into circular saws and similar types of cutters, whereby the tips may be accurately set in place with a high degree of uniformity as to position, size, degree of thickness of solder-film and with an exceedingly rapid and precisely localized application of brazing heat. It is a further object of the present invention to provide means for brazing carbide and other dense alloy tips into circular saws and similar types of cutters by the use of electronically applied heat energy.

It is a further object of the present invention to provide means for mechanically setting and holding tips in place during brazing to produce a tipped saw or cutter having tooth-tips which are uniformly and accurately brazed into position.

It is also an object of the present invention to provide an electronic saw tip brazing machine which is simple and economical in construction, use and maintenance, and very materially reduces the labor cost in manufacturing such saws and cutters.

With the above and other objects in view, my invention resides in the novel features of form, construction, arrangement, and combination of parts presently described and pointed out in the claims.

In the accompanying drawings (5 sheets),

Figure 2 is a top plan view of the electronic brazing machine;

Figure 3 is a fragmentary sectional view taken along line 3—3 of Figure 1;

Figure 1:
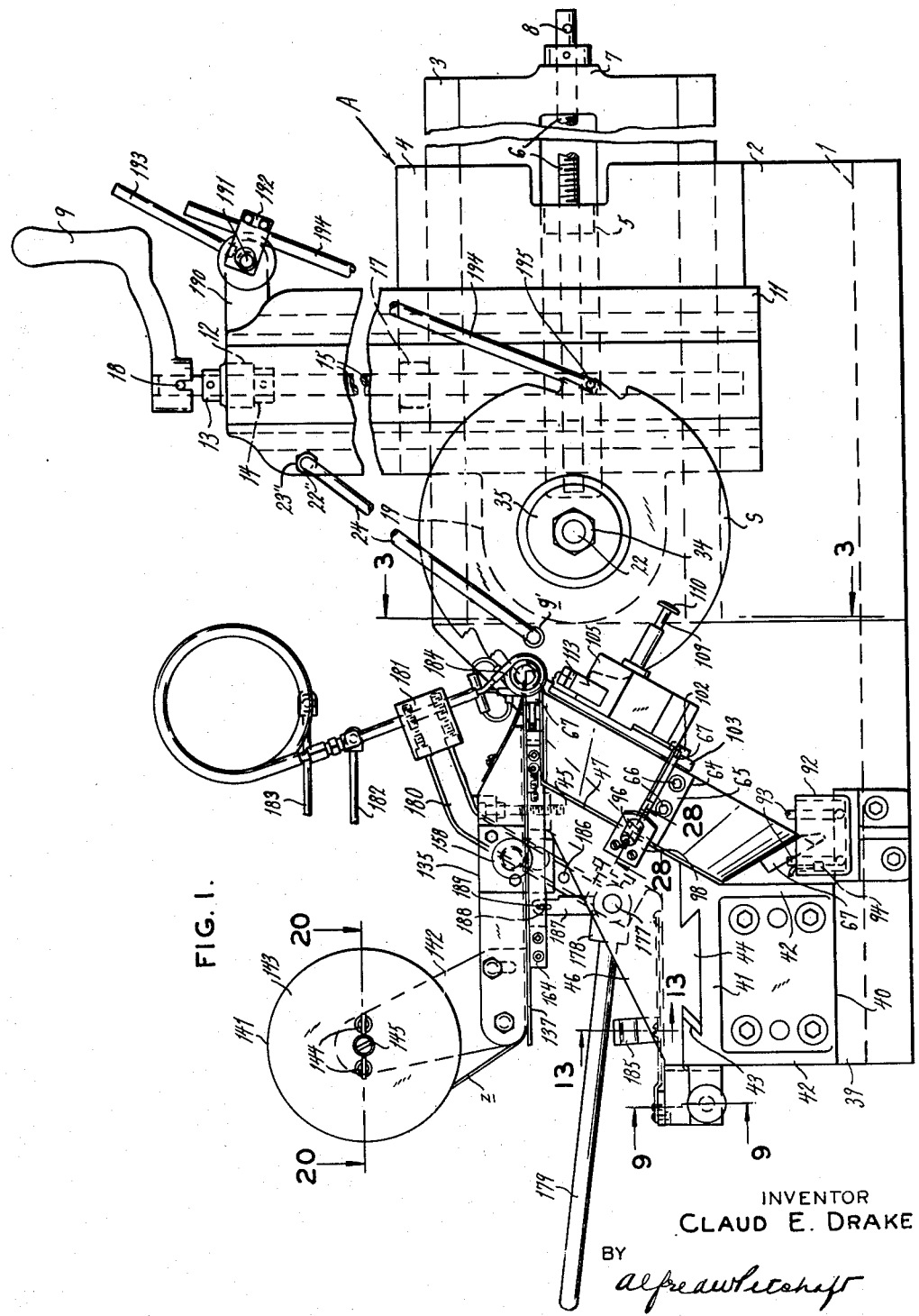
Figure 1 is a front elevational view of an electronic brazing machine constructed in accordance with and embodying the present invention.

Figures 4 and 5 are fragmentary sectional views taken along line 4—4 and 5—5, respectively, of Figure 2;

Figure 6 is a fragmentary sectional view taken along line 6—6 of Figure 5;

Figure 7 is a fragmentary sectional view taken along line 7—7 of Figure 6;

Figure 8 is a fragmentary sectional view taken along line 8—8 of Figure 7;

Figure 9 is a fragmentary sectional view taken along line 9—9 of Figure 1;

Figure 10 is a fragmentary sectional view taken along line 10—10 of Figure 9;

Figure 11 is a fragmentary sectional view taken along line 11—11 of Figure 10;

Figure 12 is an enlarged top plan view of the transverse-position indicating scale forming a part of the present invention;

Figure 13 is a fragmentary sectional view taken along line 13—13 of Figure 1;

Figure 14 is a fragmentary sectional view taken along line 14—14 of Figure 2;

Figures 15, 16 and 17 are fragmentary sectional views taken, respectively, along lines 15—15, 16—16, and 17—17 of Figure 14;

Figures 18 and 19 are fragmentary sectional views taken, respectively, along lines 18—18 and 19—19 of Figure 17;

Figure 20 is a fragmentary sectional view taken along line 20—20 of Figure 1;

Figure 21 is an exploded view of the tip holder forming a part of the present invention;

Figure 22 is a top plan view of the tip holding assembly;

Figure 23 is a bottom plan view of the tip holding assembly;

Figure 24 is a fragmentary perspective view of the lower end of the tip holding magazine forming a part of the present invention;

Figure 25 is a perspecitve view of the retention spring employed in the tip holding magazine;

Figure 26 is a fragmentary sectional view taken along line 26—26 of Figure 5;

Figure 27 is a fragmentary sectional view taken along line 27—27 of Figure 26; and Figure 28 is a fragmentary sectional view taken along line 28—28 of Figure 1.

Referring now in more detail and by reference characters to the drawings, A designates an electronic brazing machine comprising a conventional base frame 1, which may be supported from the floor, wall or any other suitable structure as may be desired. Bolted to the base frame 1 and extending vertically upward therefrom is a face plate 2, provided upon its forwardly presented face with a horizontally extending dovetail way 3 for supporting a horizontally shiftable dovetail slide 4. Threadedly mounted in and extending through the inwardly projecting integral lug 5, formed on the inside face of the slide 4, is a horizontal adjustment screw 6, suitably bearing at its one end in a collar 7 formed integrally with the way 3. The screw 6 projects through and outwardly of the collar 7 and is provided at its end with a diametrally projecting pin 8 for receiving a handle or crank 9.

The slide 4 is provided upon its outwardly presented face with a vertical dovetail way 10 for receiving a vertically shiftable dovetail slide 11. Journaled in and extending through an integral boss 12, formed on the rear face of the slide 11 and held against vertical movement with respect thereto by set collars 13, 14, is a vertical adjustment screw 15 threadedly extending through an internally threaded boss 17, formed integrally on the slide 4. At its upper end the screw 15 projects above the slide 11 and is provided, on such projecting end, with a diametral pin 18 for engagement with the handle 9. It may be noted in this connection that the projecting ends of the screws 6, 15 and their respective pins 8, 18 are of the same size so that the handle 9 may be interchangeably used with either of them.

Formed integrally with and projecting laterally from one side face of the slide 11 is a spindle supporting arm 19, having a forwardly projecting cylindrical boss 20, and the latter being in turn provided with a concentrically bored circular recess 21. Rotatably mounted in and extending axially forwardly from the recess 21 is a work-supporting spindle 22 supported and held in place by ball bearings 23, operatively mounted between a rotating ball-race 24 and a stationary ball-race 25, the latter being held in place by an annular retainer ring 26 mounted upon the outer face of the boss 20 by means of counter-sunk screws 27. Formed integrally with the work-supporting spindle 22 is a diametrally enlarged collar 28 disposed abuttingly against the end face of the rotating ball-race 24. On its outwardly presented face the collar 28 abuts against a cylindrical cap plate 29 having a rearwardly extending skirt 30 snugly overlying the outer cylindrical surface of the boss 20 and being provided with an oil soaked felt sealing ring 31 for protectingly enclosing the ball bearings 23. The cap plate 29 is concentrically bored, as at 32, for snug-fitting engagement with a diametrally reduced secondary collar 33 integrally formed as a part of the work-supporting spindle 22 in forwardly spaced relation to the collar 28. On its outer end, the work-supporting spindle 22 is threaded for receiving a retainer nut 34, which bears against a work-clamping cap 35 having an annular skirt 36 adapted to bear against the outer face of the saw plate S, which is thus clamped tightly against the face of the cap plate 29. As will be noted by reference to Figure 4, the projecting end of the work-supporting spindle 22 is substantially smaller in diametral size than the saw hole $h$ and is, therefore, provided with a tubular bushing 37 which is of sufficient axial length to fit neatly, but not tightly, between the collar 23 and the inner face of the work-clamping face 25. The bushing 37 is further provided with an annular flange 38 sized to fit precisely within the saw hole $h$ and support the saw plate S in concentric position upon the spindle 22. Threadedly mounted in and extending horizontally forwardly from the front or vertical face of the arm 19 is a guide pin 22' disposed in outwardly spaced parallel relation to the work-supporting spindle 22 and provided at its outer end with a guide-head $g$ and a lock washer 23'. The lock washer 23' can be loosened and the guide pin 22' threaded in or out, so that the guide-head $g$ will contact the rear face of the saw plate at some selected position of alignment. Thereupon, the lock nut 23' can be threaded down tightly against the outer face of the arm 19 to hold the guide pin 22' in such adjusted position. Also threadedly mounted in and extending horizontally forwardly from the slide 11 in upwardly spaced parallel relation to both the guide pin 22' and the work-supporting spindle 22 is a second guide pin 22" provided with a lock washer 23" and arm 24'. Suitably secured upon the lower end of the arm 24' and projecting inwardly therefrom is a guide-head g' adapted to be swung down into axial alignment with the guide-head g. The second guide pin 22" can be adjusted in or out, as the case may be, dependent upon the thickness of the saw plate S, so as to lightly contact the outer face thereof. When the guide pins 22', 22", are properly adjusted, the periphery of the saw plate S which is being tipped will always be held in a selected position in reference to its distance outwardly from the outer vertical face of the arm 19. It, of course, will be obvious that the adjustment of the two guide-heads g, g', will be such that the saw plate S will not be tightly gripped or bound thereby and can slide freely therebetween as it is rotated. However, since the spindle 22 floats parallel to its axis, this spindle 22 will move inwardly or outwardly slightly in an axial direction, if necessary, to compensate for any warpage or wabble which may exist in the saw plate S.

Also bolted to the base frame 1 and extending vertically upwardly therefrom in laterally spaced relation to the plate 2 is a secondary face plate 39 provided upon its forward face with a heavy, rigid bracket member 40 integrally including a horizontal base plate 41 supported by triangular webs 42. Formed in the upper horizontal face of the base plate 41 is a dove-tail way 43 extending outwardly at 90° to the plane of the face plate 39 for shiftably supporting a dove-tail slide 44. Formed integrally on the outer lateral margin of the slide 44 is an angularly upstanding arm 45 integrally supported by triangular gussets 46. It will be noted by reference to Figures 1 and 14 that the outer face 47 of the arm 45 is machined off to an angle of approximately 30° to the vertical and that the subjacent portion of the bracket web 42 is similarly machined off to provide an undercut clearance space. It, of course, should be noted in this connection that there is nothing critical about the angle of 30°, as will be presently more fully discussed.

Mounted in and extending through the arm 45 is the diametrally reduced threaded end 48 of a spindle post 49 held in place by a lock nut 50. Mounted upon the spindle post 49 between end-spacing washers 51, 52, and held in spaced relation by a bushing 53 are stationary ball-races 54, 55, for operatively supporting ball-bearings 56 which carry rotating races 57, 58, the latter being, in turn, press-fitted into concentrically counterbored recesses 59, 60, against an internal spacing shoulder 61 of a rotating head 62. The head 62 is of frusto-conical shape having an annular outer face 63 which is preferably at a complementary angle of 60° to the arm face 47, so that the uppermost portion of the face 63 will be tangent to a horizontal plane. At suitably spaced, preferably uniform, intervals around the face 63 of the head 62 are axial slots 64 each provided with a locking wedge 65 held in place by machine-screws 66 for retentively gripping tip-holding fingers 67.

Each tip-holding finger 67, as shown in Figures 21, 22, and 23, is formed preferably, though not necessarily, of aluminum, bronze, or some other suitable material which does not readily bond to the tip material when the braze is being made, and comprises a body element 68 integrally including a shank 69, an upstanding heel-block 70, and a forwardly extending side plate 71 provided along its upper inner margin with an angle-shaped groove 72 and being tapered at its outer end, as at 73. On its inner face 74, below the groove 72, the side plate 71 is provided with a pair of longitudinally spaced pins 75. The shank 69 of the body element 68 is of sufficient length to fit within and project at one end beyond the slot 64 and at such projecting end is provided with an inclined end-face 76, which is, in turn, provided with an indexing groove 77. Provided for co-operation with the body element 68 is a floating side plate 78 having an integral flange-like rib 79 which fits slidably into the groove 72 and is cut away at its forward end, as at 80. At its forward end, the side plate 78 is also tapered, as at 81, to match the tapered portion 73 of the side plate 71 and intermediate its ends is provided with a pair of axially aligned elongated slots 82 adapted for snug-fitting longitudinally shiftable engagement upon the pins 75. The side plate 78 is finally provided in its outer face with a transversely extending slot 83 for receiving the free end 84 of a wish-bone spring 85, which is, in turn, provided at its other end with a flat flange 86 apertured, as at 87, for securement upon the heel-block 70 by means of a machine screw 88, which is threaded into a tapped hole 89.

When the tip-holding finger 67 is assembled, as shown in Figures 22 and 23, the floating side plate 78 is slightly shorter than the side plate 71, so that its inner end is spaced outwardly from the opposing inner face of the heel-block 70. Furthermore, the recess 80 co-operates with the opposed parallel face of the groove 72 to provide an upwardly and outwardly opening rectangular recess 90 sized for receiving the prism-shaped carbide or dense alloy saw tip $x$, which is molded to rather precise tolerance in a predetermined shape to fit correspondingly shaped recesses $r$ formed in the teeth of the saw plate S. Since the saw tips $x$ are molded and sintered, it is impossible, even by the most rigid precautions, to achieve a closer tolerance than ±.001. The floating side plate 78, however, is capable of shifting rearwardly or outwardly several thousandths of an inch to accommodate for these variations and the outer edges of the recesses 90 are chamfered off slightly to facilitate the entrance into the recess 90 of tips $x$, which are slightly wider than normal. Actually, the tip-holding recess 90 is deliberately machined to a slightly undersized dimension with reference to the designed width of the tips $x$, so that every tip $x$ will push the floating side plate 78 outwardly a slight distance against the tension of the wish-bone spring 85, thereby insuring that each tip $x$ is gripped snugly within the recess 90.

Preferably, though not necessarily, the side plate 71 is provided with a vertical aperture 91 extending therethrough from top to bottom and opening upon the under face of the groove 72 merely for ventilating and heat dissipating purposes. This venting aperture 91 is desirable since the projecting end of the tip-holding finger 67 is in the heated zone while the braze is being made, as will be presently more fully discussed. It should be noted in this connection that the tip holding fingers 67 project outwardly from the slots 64 so that the tip retaining recess 90 is completely in the clear. Because of the angular relationship between the frusto-conical side face 63 of the rotating head 62 and the axis of the spindle post 49, each tip holding finger 67 will be substantially horizontal when the head 62 is rotated to bring it up on top and when the head 62 is rotated to bring it down to the bottom it will be almost vertical and will be carried into an open topped rectangular pan 92 supplied with water from supply lines 93 to maintain a water-level such that the tip-holding fingers 67 when disposed downwardly will dip down thereinto. Immersed in the water is a conventional electric heater 94 which is thermostatically controlled to keep the water warm, all for the purposes presently more fully appearing.

The tip holding fingers 67 do not extend all the way into the slots 64 hence the rearward ends thereof are open for detent-forming engagement with a relatively large ball 95 retentively held in the peened-down, open end of a tubular socket-shell 96 which is externally threaded and thus mounted in an angularly bent flange portion 97 of a supporting bracket 98 which is in turn bolted upon an adjacent side face of the arm 45. The socket-shell 96 is integrally provided with an end wall 99 and threaded therethrough is an adjustment screw 100 seated at its inner end in one end of a compression spring 101 which is, in turn, at its other end, seated against the ball 95 which thereby functions as a resilient indexer in cooperation with the several slots 64, as will presently be more fully described.

Held securely upon the outwardly projecting end of the spindle post 49 by means of a nut 102 is a radially upwardly projecting bracket 103 having an angular flange 104 to which is bolted a block 105 having a slot 106 extending therethrough. Bolted or otherwise suitably secured upon the outer end face 107 of the block 105 in alignment with the slot 106 is a tubular plunger shell 108 for operatively receiving a spring pressed plunger 109 which projects at one end outwardly therefrom and is provided on such projecting end with a finger knob 110 and at its other end the plunger 109 enters and snugly but slidably fits the slot 106. Formed in the block 105 adjacent the face 111 thereof is a vertically extending chamber 112 of rectangular cross sectional shape for receiving the lower end of a tip magazine 113 comprising a long metal bar 114 transversely milled off along one of its flat faces adjacent its ends to provide clip retention faces 115. Upon its opposite flat face the bar 114 is longitudinally milled out to provide an open ended groove or slot 116 sized for loosely accommodating a substantial supply of stacked tips $x$. The lower end of the groove 116 opens into a transverse discharge slot 117 and the side face of the bar 114 is kerfed to provide a short slot 118 opening into the discharge slot 117 for receiving the U-shaped end portion 119 of a drag spring 120 which is bent over at the remote end of its shank in the provision of a tail piece 121 for insertion into a retention recess 122 formed in the bar 114. Removably disposed over the retention faces 115 and extending around the ends and across the grooved face of the bar 114, is a spring bronze clip 123 which serves as a closure for the groove 116. The magazine may be loaded by removal of the clip 123 and when loaded, the latter may be replaced to retain the tips $x$ in place. The magazine may then be slipped snugly into place within the chamber 112. It will be noted by reference to Figure 7 that the floor of the chamber 112 is cut down slightly below the lower surface of the plunger 109 to allow for the thickness of the bottom flange of the clip 123. Thus, the lowermost saw tip $x$ within the magazine 113 is located directly in front of the plunger 109 and, furthermore, is retained within the magazine 113 against unauthorized removal by the end portion 119 of the spring 120.

The bracket 103 is provided with a threaded aperture 124 located below the flange 104 with its center on the radial line extending from the center of the spindle post 49 and intersecting the center line of the magazine groove 116. Threadedly mounted in an extending through the aperture 124 is a rotary pintle 125 integrally provided on its outer end with a right angular handle 126 and locked in any selected position of rotation by a lock nut 127. Drilled eccentrically into the end face 128 of the pintle 125 is a cylindrical bore 129, the axis of which is parallel to the axis of the pintle 125 and the outer or end margins of which are peened over as at 130 to retain a large ball 131 resiliently urged outwardly by the compression spring 132. The ball 131 is adapted to ride partially into the lower outwardly presented portion of each slot 64 as the head 62 is rotated so that the tip holding finger 67 in such slot 64 will be indexed accurately into alignment with the longitudinal center line of the tip $x$ which is in the magazine 113 ready to be ejected therefrom upon manipulation of the plunger 109.

Since various types of saw plates are of various thickness or "gauge," as it is called, it is necessary to be able to handle tips $x$ in any of the corresponding widths. To this end the magazines 113 are of standard outside dimensions so as to fit interchangeably into the chamber 112 but the grooves 116 are of different sizes. Thus, one magazine 113 with an appropriately dimensioned groove 116 will accommodate tips for 14 gauge saws, another magazine 113 with an appropriately sized groove 116 will accommodate tips for 12 gauge saws and so on. As has been stated, however, there is some appreciable variation in size within tips of any given gauge so the groove 116 and discharge slot 117 must be slightly oversized and these variations are rendered unimportant as each tip $x$ is ejected responsive to operation of the plunger 109 since the U-shaped end 119 of the spring 120 forces each outwardly moving tip $x$ against the inside face of the clip 123 as a uniform and fixed plane of reference. This means that the center line of the different grooves 116 will not always coincide precisely with the center line of the tip holding fingers 67. This variation may be compensated by loosening the lock nut 127 and swinging the handle 126 to rotate the pintle 125 displacing the ball 131 eccentrically to one side or the other of the true center line so that when the head is brought to rest with one of the tip holding fingers 67 in front of the magazine 113, the center line of such tip holding finger 67 and the center line of the tip $x$ will be substantially co-incident. Once this adjustment is made for a particular magazine 113, the lock nut 127 may be tightened down and the proper alignment will remain fixed as long as tips are being dispensed from that magazine 113 or any other magazine 113 of the same gauge.

Mounted upon the top face of the arm 45 by means of bolts 133 is a support block 134 and a solder feeding head 135 having an inclined nose portion 136. Bolted upon the under face of the solder feeding head 135 is a flat plate 137 extending at its forward end 138 outwardly beyond the nose portion 136 and similarly bolted upon the inclined face of the nose portion 136 is a resilient hold down blade 139 which also projects out over and is flexed down upon the forward end 138 of the plate 137, as shown in Figure 14. Milled centrally in the under face of the solder feeding head 135 is a longitudinal slot 140 sized for slidably accommodating a ribbon of solder which extends therethrough from a reel 141 spindled upon a supporting arm 142 which is, in turn, bolted to, and extends upwardly from, the solder feeding head 135. It will be noted by reference to Figure 20 that the reel 141 is preferably provided with a removable face plate 143 held in place by thumbscrews 144 and a central bolt 145. It will also be noted that the plate 137 forms a closure for the slot 140 and as the ribbon z slides forwardly out of the slot 140 it is held down against the forward end 138 of the plate 137 by means of the blade 139.

Secured rigidly upon the under face of the plate 137 by means of bolts 146 which extend up into the body of the solder feeding head 135 is a roller housing block 147 provided with an accurate recess 148 the side walls of which are vertically slotted as at 149 to receive a short shaft 150 carrying a roller 151. Directly above the recess 148, the solder feeding head 135 is provided with an arcuate recess 152 which communicates with the recess 148 through a slot 153 in the plate 137. Drilled into the bottom walls of the slots 149 are recesses 154 receiving compression springs 155 which bear against the shaft 150 and urge the roller 151 resiliently upwardly so as to press the ribbon z firmly against a star wheel w operatively mounted in the recess 152 and primed to a shaft 156 which is journaled in and extends transversely through the solder feeding head 135. One end of the shaft 156 is projected through a grill 157 and is provided at its end with a knurled knob 158. Keyed to the other end of the shaft 156 is a conventional over-running clutch 159 supportingly engaging a pinion 160 held in place by a nut 161.

The roller housing block 147 is integrally provided with laterally projecting horizontal shoulders 162 having upwardly presented slide faces 163 for operatively supporting a pair of parallel slide bars 164, 165, held together at their opposite ends by cross blocks 166, 167, the upper faces of which slide smoothly against the under face of the plate 137. Recessed into and extending between the support block 134 and cross block 167 is a compression spring 168 for normally urging the bars 164, 165, forwardly. Formed integrally with and projecting forwardly from the cross block 167 is a stop finger 169 adapted for abutment against the heel of each tip holding finger 67 as it is rotated into top side position and index it into alignment with the saw blade s. In this connection it should be noted that the bracket 98 and its supported shell 96 are so located that the ball 95 will bear against the upper edge of the next succeeding slot 64 to bias the head 62 and urge the tip holding finger 67 in such indexed position.

Formed integrally with and extending rearwardly from the slide 44 is a boss 170 which projects loosely between bosses 171, 172, formed integrally with the base plate 41, the latter being threadedly provided with axially aligned adjustment screws 173, 174, respectively, which bear against the boss 170. By this means the slide 44 can be shifted in or out through a narrow but adequate range of adjustment to line up the stop finger 169 properly with the saw plate S so that when a tip holding finger 67 is brought to rest thereagainst the tip x is properly positioned for precisely seated disposition in the tooth recess r. In order that this adjustment may be fully precise a conventional vernier gauge 175 is provided, as shown in Figures 10, 11, and 12, although any other type of gauge may be employed as desired.

Formed integrally with and extending rearwardly from the arm 45 are spaced bosses 176 for rotatably supporting one end of a shaft 177 which is journaled at its other end in the gusset 46. Pinned to the shaft 177 adjacent the gusset 46 is a radial casting 178 provided with a rod-like handle 179. Similarly pinned to the shaft 177 between the bosses 176 is an angular arm 180 extending forwardly and upwardly to a point substantially above the nose portion 136 of the solder feeding head 135 and being at such end integrally provided with a saddle block 181 for clampwise receiving spaced parallel water-cooled leads 182, 183, of a doubly convoluted work coil 184 which depends downwardly therefrom and will, when in the operative position shown in Figure 1 embrace the projected end of the tip holding finger 67 which is seated against the stop finger 169. By rocking the handle 179 downwardly the work coil 184 may be raised up out of operative position to clear the work and as it approaches the lower limit of its travel, the handle 179 will snap into engagement with a spring detent 185 so that the work coil 184 will be held in elevated position for as long as may be desired. The leads are connected to a source of electronic heat energy (not shown).

Rigidly mounted in and extending horizontally from the arm 180 is a heavy pin 186 located for delayed abutment against a rock arm 187 pivoted at its lower end on the shaft 177 and provided at its upper end with a slot 188 for operative engagement with a pin 189 carried by and extending horizontally between the bars 164, 165. Finally, the bar 165 is provided upon its upper horizontal face with rock teeth for driving engagement with the pinion 160.

Preferably, though not necessarily, the slide 11 is integrally provided with a rearwardly projecting horizontal arm 190 provided with a laterally projecting pintle 191 upon which is mounted a rock arm 192 having a handle 193 and downwardly extending long rod 194 which is, in turn, provided in its end with a lateral pin 195 optionally adapted to seat in any one of the gullets of the saw blade s for purposes presently more fully appearing. The rod 194 is, however, normally disposed up out of gullet engaging position.

In use a saw plate S is placed upon the spindle 22 and the collar 35 clamped down in place as previously described. The slide 11 is then adjusted horizontally and vertically so that the rim of the saw S will pass through the central space within the work coil 184 with the bottom wall of each recess r in substantially horizontal position. Since the slide 11 can be adjusted up and down it is possible to accommodate any angle of rake or hook in the saw plate S. A tip holding finger 67 is brought up against the stop finger 169 and the slide 44 is adjusted so that the center line of the tip x is accurately aligned with the center plane of the saw plate S. With these few simple adjustments made the proper magazine 113 with the correct size of tips x is inserted and the head 62 is rotated until the next succeeding tip holding finger 67 is aligned with the discharge opening 117 by reason of engagement between the forward end of the slot 64 and the ball 131, as previously described. Thereupon the plunger 109 is pushed in and a tip x will be ejected directly into the tip holding recess 90. As the tip x is being ejected it will cam the U-shaped end 119 of the spring 120 outwardly and at the same time be resiliently pushed thereby into stabilized sliding contact with the inner face of the clip 123. In entering the recess 90, the tip will press the floating side plate 78 slightly outwardly against the bias of the spring 85 and be held snugly in place thereby. The floating side plate 78 accommodates and compensates for any of the normally encountered variations in size and shape between the various tips x due to manufacturing tolerances and the like. Of course, a grossly mis-sized or shaped tip x should be rejected before placement in the groove 116 of the magazine 113. The bottom or seat face of the tip x will stand up out of the recess 90.

The head 62 is then rotated to bring the loaded tip holding finger 67 up into brazing or indexed position and as this is done the handle 179 is released from the detent spring 185 and swung upwardly to lower the work coil 184 into operative position. Simultaneously, the rock arm 187 is allowed to swing forwardly permitting the bars 164, 165, and the cross block 167 to slide forwardly so that the stop finger 169 is brought into place. This same action rotates the pinion 160 which rotation is transmitted through the clutch 159 to the shaft 156 and star wheel w thereby driving a short length of solder ribbon z outwardly over the indexed tip x. During these operations the particular tooth into which the tip x is to be brazed is disposed upwardly out of engagement with the indexed tip x so as not to interfere with the indexing and solder ribbon feeding operations. Therefore, the saw plate S is now rotated to bring the recess r down on the tip x squeezing the protruding length of solder ribbon z therebetween. Meanwhile, soldering flux has been manually brushed on the tip x and exposed faces of the recess r in any convenient manner.

Finally, the current is turned on and timed preferably by some conventional automatic means (not shown) and the braze completed in a matter of seconds. Ordinarily, the heat will sever the fused solder from the remainder of the ribbon z but frequently slight filaments remain and the fused flux also tends to stick the tip x in the recess 90. Hence, the rod 194 is shafted downwardly and the pin 195 engaged in and adjacent the gullet of the saw blade s applying somewhat tangential pressure thereto and "freeing" the brazed tip, so to speak. The handle 179 is then swung downwardly again to initial position lifting the work coil 184 out of the way. As it returns to initial position the pin 186 picks up the rack arm 187 shifting the stop finger 167 out of the way. This return motion, however, is not transmitted through the overrunning clutch 159 to the shaft 156, hence the star wheel w and the ribbon z remain stationary.

The saw plate can then be rotated to bring a new tooth into position and the operation repeated successively until all teeth are tipped. Because most available fluxes tend to spatter when heated, the work coil must be most carefully and thoroughly insulated with chemically and thermally inert material and, in some cases, it has been found desirable to fold a thin strip of mica over the tooth and tip just prior to application of heat so as to protect the work coil from the spattering flux. It will also be noted that as the head 62 rotates through its various positions, the used and flux bespattered tip-holding finger 67 will dip into the water bath in the pan 92 and be cleansed, since the flux dissolves off promptly in warm water.

By removing the work-supporting spindle 22 and thereupon taking out the screws 27, the retainer ring 26 and ball bearing assembly 24, 25, can be removed. A conventional work-holding vise (not shown) can then be mounted by means of the screws 27, or any other conventional means, upon the work-supporting arm 19 for clampwise holding a band saw, which can then be tipped in substantially the same manner as above described. This is entirely feasible inasmuch as the slide 11 can be shifted vertically up and down through a relatively wide range, thereby permitting a substantially straight section of band saw teeth to be tipped successively in a single clamped set-up within the vise.

It should be understood that changes and modifications in the form, construction, arrangement, and combination of the several parts of the means for making carbide tipped saws and in the steps of its production may be made and substituted for those herein shown and described without departing from the nature and principle of my invention.

Having thus described my invention, what I claim and desire to secure by Letters Patent is:

1. A machine for brazing tips in tools which comprises means for holding the tool, a magazine for holding a plurality of tips, a movable head having a plurality of spaced fingers each adapted for receiving a tip from the magazine and moving it into engagement with the tool in the proper position for securement thereto, and means for cleaning each finger subsequent to use and prior to re-use.

2. A machine for brazing tips in toools comprising means for holding the tool, a movable tip-receiving fixture, each fixture having a resilient back and side wall for accommodating minor variations in the size of successive tips, a magazine for holding a plurality of tips, a manually operable plunger for transferring a tip from the magazine to the fixture, means for moving the fixture into alignment with the tool and the tip in position to be brazed thereto, and means for heating the positioned tip and the tool in the immediate regions of their juncture.

3. A machine for brazing tips in tools comprising means for holding the tool, a magazine for holding a plurality of tips, means for transferring a tip from the magazine to the tool in position to be brazed thereto, means for feeding a predetermined quantity of brazing alloy between the tip and the tool, means for heating the positioned tip and the tool in the immediate regions of their juncture, and means for moving the heating means into and out of operative position, said last-named means being so connected to the heating means as to have a predetermined amount of overtravel as the heating means comes to rest in inoperative position, and said last-named means being also connected to the feeding means so as to actuate the feeding means during return movement after overtravel.

4. A machine for brazing tips in tools which comprises means for holding the tool, a magazine for holding a plurality of tips, a movable head having a plurality of spaced fingers each adapted for receiving a tip from the magazine and moving it into engagement with the tool in the proper position for securement thereto, and means for shifting the magazine to any desired position with respect to the head within a limited range of adjustment.

5. A machine for brazing tips in tools comprising means for holding the tool stationary in a selected position with the recess into which the tip is to be brazed positioned outwardly and clear of lateral obstructions so that the tip may be passed freely through the recess from side to side, a strip-solder feeding magazine disposed in outwardly spaced relation to, and in endwise alignment with, the positioned tip-receiving recess, means for feeding a predetermined length of strip-solder into the recess, a rotating head operatively mounted in outwardly spaced relation to the tool and having a projecting tip-holding element located on the head in such manner that upon rotation of the head the outer end of the tip-holding element will pass laterally into and through the positioned recess of the tool, a stationary magazine mounted adjacent the path of movement of the tip-holding element, and means associated with the magazine for optionally ejecting a tip and depositing the ejected tip in a predetermined position in the tip-holding element.

6. A machine for brazing tips in tools comprising means for holding the tool stationary in a selected position with the recess into which the tip is to be brazed positioned outwardly and clear of lateral obstructions so that the tip may be passed freely through the recess from side to side, a strip-solder feeding magazine disposed in outwardly spaced relation to, and in endwise alignment with, the positioned tip-receiving recess, means for feeding a predetermined length of strip-solder into the recess, a rotating head operatively mounted in outwardly spaced relation to the tool and having a projecting tip-holding element located on the head in such manner that upon rotation of the head the outer end of the tip-holding element will pass laterally into and through the positioned recess of the tool, a stationary magazine mounted adjacent the path of movement of the tip-holding element, means associated with the magazine for optionally ejecting a tip and depositing the ejected tip in a predetermined position in the tip-holding element, and manually releasable stop-forming means located along the path of the tip-holding element and adjacent to the tool for optionally stopping the tip-holding element during the course of its lateral travel into the positioned recess so that the tip carried by the tip-holding element will come to rest in the desired position for brazing with the strip of solder snugly interposed between the tip and the adjacent faces of the positioned recess.

7. A machine for brazing tips in tools comprising means for holding the tool stationary in a selected position with the recess into which the tip is to be brazed positioned outwardly and clear of lateral obstructions so that the tip may be passed freely through the recess from side to side, a strip-solder feeding magazine disposed in outwardly spaced relation to, and in endwise alignment with, the positioned tip-receiving recess, means for feeding a predetermined length of strip-solder into the recess, a rotating head operatively mounted in outwardly spaced relation to the tool and having a projecting tip-holding element located on the head in such manner that upon rotation of the head the outer end of the tip-holding element will pass laterally into and through the positioned recess of the tool, a stationary magazine mounted adjacent the path of movement of the tip-holding element, means associated with the magazine for optionally ejecting a tip and depositing the ejected tip in a predetermined position in the tip-holding element, and a vessel adapted to be filled to a predetermined level with a cleansing bath, said vessel being also positioned along the path of movement of the tip-holding element so that upon rotation of the head subsequent to manual release of the stop-forming means the tip-holding element will pass into the cleansing bath.

CLAUD E. DRAKE.

References Cited in the file of this patent
UNITED STATES PATENTS

| Number | Name | Date |
| --- | --- | --- |
| 1,699,091 | Butler | Jan. 15, 1929 |
| 1,876,821 | Dugen | Sept. 13, 1932 |
| 1,884,683 | Hermani | Oct. 25, 1932 |
| 1,885,584 | Brisbois | Nov. 1, 1932 |
| 2,057,037 | Kronquest | Oct. 13, 1936 |
| 2,311,433 | Dershem | Feb. 16, 1943 |
| 2,326,674 | Pavitt | Aug. 10, 1943 |
| 2,419,484 | Danziger | Apr. 22, 1947 |
| 2,477,129 | Johnson | July 26, 1949 |
| 2,481,081 | Celva | Sept. 6, 1949 |